United States Patent
Smith et al.

(10) Patent No.: US 8,668,141 B2
(45) Date of Patent: Mar. 11, 2014

(54) DIGITAL RECEIPT READING DEVICE, SOFTWARE AND METHOD OF DIGITAL RECEIPT READING

(75) Inventors: Martin Smith, Scotland (GB); Nathaniel Christopher Herwig, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 4 days.

(21) Appl. No.: 12/977,178

(22) Filed: Dec. 23, 2010

(65) Prior Publication Data
US 2012/0160911 A1 Jun. 28, 2012

(51) Int. Cl.
*G06Q 40/00* (2012.01)

(52) U.S. Cl.
USPC .......................................... 235/379; 235/375

(58) Field of Classification Search
USPC ........................ 705/14.33, 14.3; 235/379, 375
See application file for complete search history.

(56) References Cited

U.S. PATENT DOCUMENTS

| 5,848,426 | A | 12/1998 | Wang et al. |
| 5,969,324 | A | 10/1999 | Reber et al. |
| 7,970,669 | B1 * | 6/2011 | Santos ............................ 705/30 |
| 2003/0135432 | A1 * | 7/2003 | McIntyre et al. ............... 705/28 |
| 2010/0138344 | A1 * | 6/2010 | Wong et al. ..................... 705/44 |
| 2010/0299217 | A1 | 11/2010 | Hui |
| 2011/0055030 | A1 | 3/2011 | Nicolas et al. |
| 2011/0093344 | A1 | 4/2011 | Burke et al. |
| 2011/0307318 | A1 * | 12/2011 | LaPorte et al. ............. 705/14.33 |

OTHER PUBLICATIONS

Final Office Action for U.S. Appl. No. 12/977,145 mailed Apr. 11, 2013.
Non-Final Office Action for U.S. Appl. No. 12/977,145 mailed Oct. 16, 2012.

* cited by examiner

*Primary Examiner* — Thien M Le
*Assistant Examiner* — Sonji Johnson
(74) *Attorney, Agent, or Firm* — Paul W. Martin; Peter H. Priest

(57) ABSTRACT

A customer's mobile device comprises a camera and a processor. The camera is used to scan a two-dimensional barcode which has encoded within it transaction details and ancillary information relating to purchases made by a customer in their receipted transaction.

9 Claims, 3 Drawing Sheets

DIGITAL RECEIPT READING DEVICE, SOFTWARE AND METHOD OF DIGITAL RECEIPT READING

FIELD OF THE INVENTION

The present invention relates to a digital receipt device, software and a method of digital receipt reading.

BACKGROUND OF THE INVENTION

Typically, a customer at a retail check-out receives a printed paper receipt which details their purchases and their details of their payment transaction, customers are used to that experience. Sometimes a retailer prints a one dimensional barcode on a receipt for their own internal purposes, for example as a discount coupon against a future purchase.

Currently a digital transaction receipt comprises an e-mail message, or an SMS message, sent to the customer detailing their transaction. Typically, this e-mail contains details of purchases such as item description and price and payment method, typically no further information relating to the transaction is included. Usually there is insufficient information contained in this e-mail to permit the easy exchange and return of purchases to the retailer. Also, as it is relatively easy to forge an e-mailed digital receipt there is great opportunity for theft by a third party pretending to be a customer returning counterfeit, or stolen, goods along with a forged digital receipt to receive either a refund or replacement, genuine, goods. Additionally, there are data privacy and security concerns over this type of digital receipt in that the customer must provide an e-mail address or mobile telephone number to the retailer in order to receive the digital receipt.

SUMMARY OF THE INVENTION

According to a first aspect of the present invention there is provided a mobile device comprising:
a processor; and
an image capture device;
the image capture device being arranged to capture an image rich optical code corresponding to receipt data relevant to a transaction, the image rich optical code being output from an output device of a transaction terminal; and
the processor being arranged to extract data relevant to a transaction carried out at the transaction terminal from the optical code.

The optical code may comprise a two-dimensional barcode. The two-dimensional barcode may comprise a QR-code. The optical code may have an information content of in excess of two thousand eight bit-binary characters. The optical code may have an information content in excess of two thousand five hundred eight bit-binary characters.

The data extracted by the processor may comprise transaction data and/or ancillary data to the transaction for which the optical code is generated. The data extracted by the processor may be selected from the following, non-exhaustive, list: purchased items, store, sales person, cost per item, tax per item, total cost, total tax, digital authentication certificate, a link to a web page, discount coupon, warranty offer.

The link to the web page may comprise any of the following: a link to a customer survey, a link for the customer to enroll in the manufacturer's warranty program, a link to enroll in relevant subscription services, a link to view the shopper's latest loyalty program balance, a link to view offers associated with a loyalty program, a link to information relating to items purchased, a link to a social network service.

The processor may be arranged to act upon the data upon its being extracted from the optical code. The processor may be arranged to upload financial data extracted from the data to a financial management application. The processor may be arranged to activate a link to a web page upon the extraction of a link from the data.

The mobile device may comprise any of the following: a mobile telephone, a smartphone, a personal digital assistant, a tablet computer, an electronic wallet, a netbook, a laptop computer.

The transaction terminal may comprise any of the following: an automated teller machine (ATM), an information kiosk, an electronic funds transfer (EFT) terminal, a financial services centre, a bill payment kiosk, a lottery kiosk, a postal services machine, a check-in and/or check-out terminal, a self-checkout point-of-sale (POS) terminal, POS terminal, a personal computer, another mobile device configured as a transaction system.

According to a second aspect of the present invention there is provided a computer program for use in a mobile device which when executed on a processor of the mobile device causes the processor to:
instigate the capture of an image of an information rich optical code at an image capture device of the mobile device; and
extract data relevant to a transaction carried out at the transaction terminal from the optical code.

The data extracted by the processor may comprise transaction data and/or ancillary data to the transaction for which the optical code is generated. The data extracted by the processor may be selected from the following, non-exhaustive, list: purchased items, store, sales person, cost per item, tax per item, total cost, total tax, digital authentication certificate, a link to a web page, discount coupon, warranty offer.

The link to the web page may comprise any of the following: a link to a customer survey, a link for the customer to enroll in the manufacturer's warranty program, a link to enroll in relevant subscription services, a link to view the shopper's latest loyalty program balance, a link to view offers associated with a loyalty program, a link to information relating to items purchased, a link to a social network service.

The software may also cause the processor to act upon the data upon its being extracted from the optical code. The software may cause the processor to upload financial data extracted from the data to a financial management application. The software may cause the processor to activate a link to a web page upon the extraction of a link from the data.

The software may comprise an applet. The applet may be uploaded to the mobile device by a user of the device. The applet may be installed on the mobile device by the manufacturer.

The optical code may comprise a two-dimensional barcode. The two-dimensional barcode may comprise a QR-code. The optical code may have an information content of in excess of two thousand eight-bit binary characters. The optical code may have an information content in excess of two thousand five hundred eight-bit binary characters.

According to a third aspect of the present invention there is provided data storage device having recorded thereupon a computer program according to the second aspect of the present invention.

According to a fourth aspect of the present invention there is provided a method of receiving electronic transaction receipt generated at a transaction terminal comprising the steps of:

(i) capturing an image of said optical code at an image capture device of a user's mobile device, which is separate from the terminal; and (ii) extracting data relevant to a transaction carried out at the transaction terminal from the optical code at a processor of the mobile device.

The optical code may comprise a two-dimensional barcode. The two-dimensional barcode may comprise a QR-code. The optical code may comprise an information content of in excess of two thousand eight-bit binary characters. The optical code may comprise an information content in excess of two thousand five hundred eight-bit binary characters.

The data extracted by the processor may comprise transaction data and/or ancillary data to the transaction for which the optical code is generated. The data extracted by the processor may be selected from the following, non-exhaustive, list: purchased items, store, sales person, cost per item, tax per item, total cost, total tax, digital authentication certificate, a link to a web page, discount coupon, warranty offer.

The link to the web page may comprise any of the following: a link to a customer survey, a link for the customer to enroll in the manufacturer's warranty program, a link to enroll in relevant subscription services, a link to view the shopper's latest loyalty program balance, a link to view offers associated with a loyalty program, a link to information relating to items purchased, a link to a social network service.

The method may comprise uploading financial data extracted from the data to a financial management application. The method may comprise activating a link to a web page upon the extraction of a link from the data.

The transaction terminal may comprise any of the following: an automated teller machine (ATM), an information kiosk, an electronic funds transfer (EFT) terminal, a financial services centre, a bill payment kiosk, a lottery kiosk, a postal services machine, a check-in and/or check-out terminal, a self-checkout point-of-sale (POS) terminal, POS terminal, a personal computer, another mobile device configured as a transaction system.

BRIEF DESCRIPTION OF THE DRAWINGS

The invention will now be described, by way of example only, with reference to the accompanying drawings, in which.

DESCRIPTION OF PREFERRED EMBODIMENTS

Figure 1:
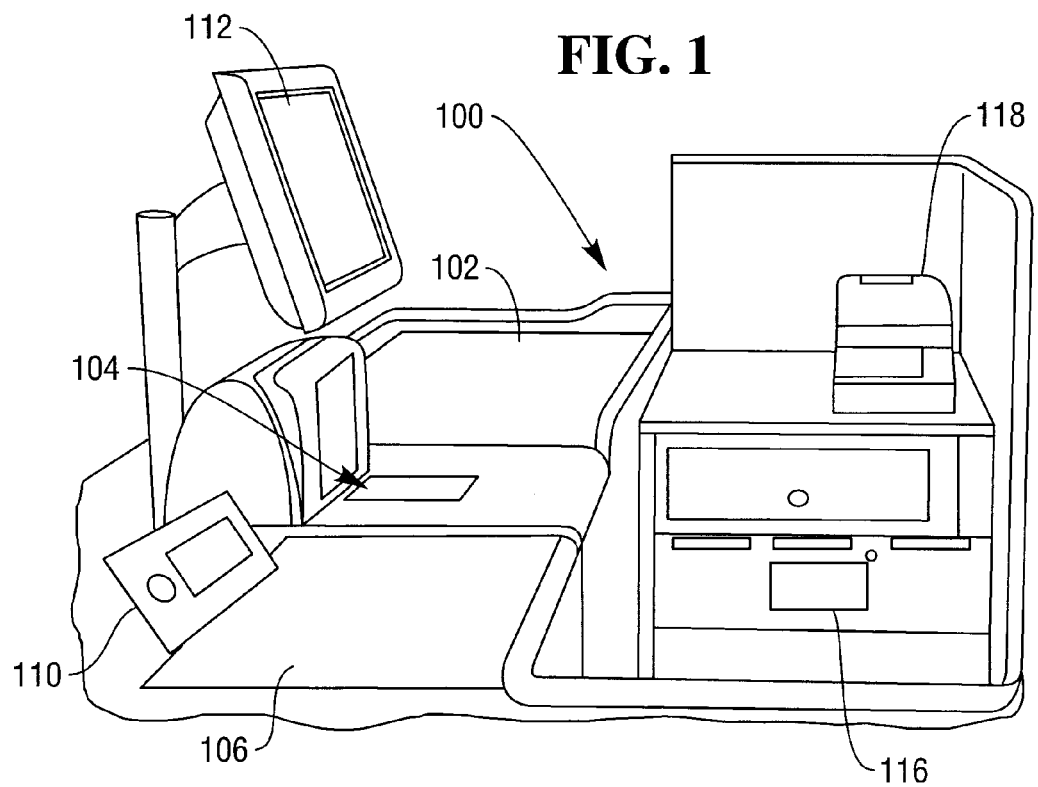
FIG. 1 is a schematic representation of a first embodiment of a checkout terminal.
Figure 2:
FIG. 2 is a representation of one embodiment of a receipt printed by a receipt printer of the checkout terminal of FIG. 1.

Referring now to FIGS. 1 and 2, a retail checkout terminal 100 comprises a conveyor belt drive 102, a barcode scanner 104, a bagging area 106, a secure combined card reader and PIN pad 110, a cashier display 112, a processor 116 and a receipt printer 118.

A customer places their purchased items on the belt drive 102 such that they are driven to the scanner 104 where the sales assistant scans the items and places them in the bagging area 106 for the customer to bag up. During the scanning of the items the processor 116 runs a software routine which uses the items barcode to search for ancillary information relating to the purchase. Typically, but not exclusively, the software will be provided as a DLL which is installed into the checkout terminal 100 as a plug-and-play module. For example, the ancillary information can be taken from a customer relationship management database to which the terminal 100 is connected and may relate to cross-purchases made by other customers who purchased a particular item. Alternatively, or additionally, the ancillary information can comprise offers, such as a discount associated with future purchases of an item, or details of a warranty for an item that the customer has purchased.

The processor 116, operating the software, collates the ancillary information as well as financial and payment information about purchased items, such as price per item, tax per item, total cost of items, total tax per item and encodes all of this information into a two-dimensional barcode, such as a QR code. It will be appreciated that although described with reference to a QR code any suitable form of two dimensional barcode can be used.

The processor 116 then instructs the receipt printer 118 to print a receipt 120 detailing the items and their cost presented as an alphanumeric list 122 along with the two-dimensional barcode 124 which has both the financial information and the ancillary information coded within it. It will be appreciated that although shown with printing on one side only the receipt may comprise two-sided thermal printer paper and the list 122 may be printed on one side of the receipt and the barcode 124 on the other to reduce the amount of paper required. It will be further appreciated that the list need 122 not be printed and all information relevant to the transaction may be present only in the two-dimensional barcode 124 depending upon their merchant's preference and/or the customer's preference.

Figure 3:
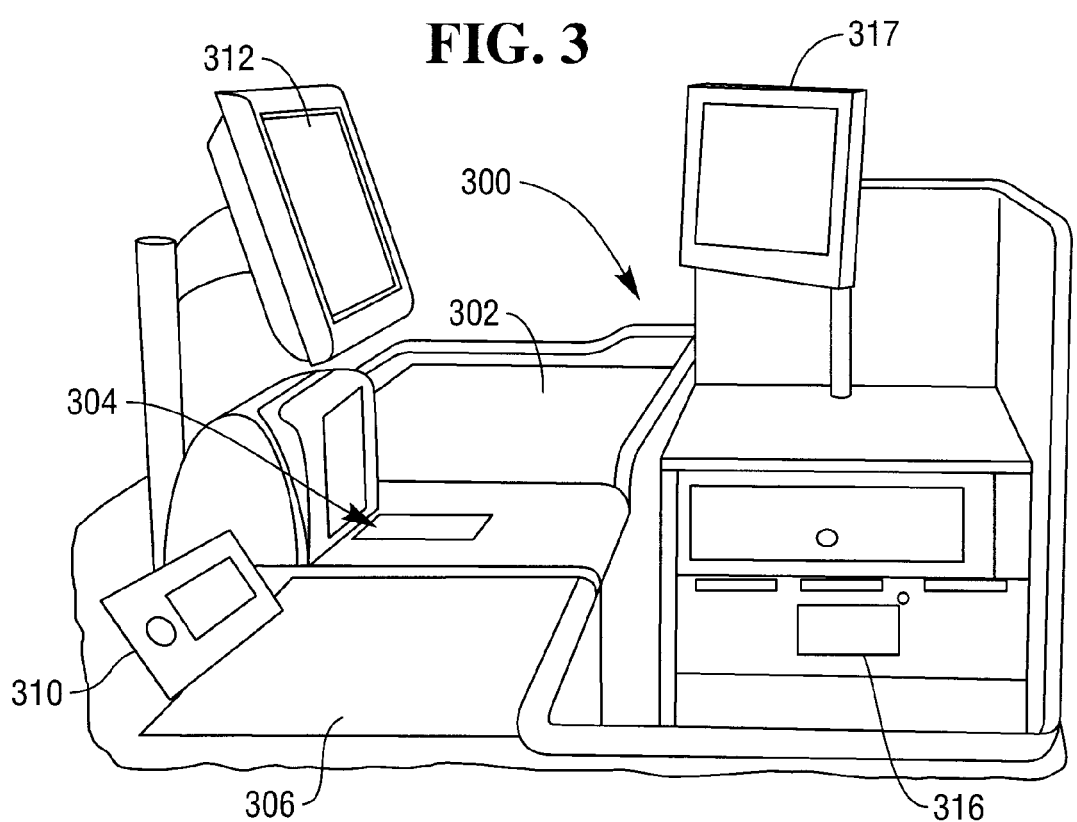
FIG. 3 is a schematic representation of a second embodiment of a POS terminal.

Referring now to FIG. 3, a checkout terminal 300 is comprised of substantially the same parts as that described with reference to FIG. 1 and consequently corresponding parts will be accorded similar reference numerals in the three hundred series.

The checkout terminal 300 comprises a conveyor belt drive 302, a bi-optic laser barcode scanner 304, a bagging area 306 and a sales assistant operated secure combined card reader and PIN pad 310, a cashier display 312, a processor 316 and customer display screen 317.

The purchase and collation of information relating to the purchased items is the same that described in relation to FIG. 1. However, rather than being printed onto a physical receipt a two-dimensional barcode corresponding to the financial information and the ancillary information is displayed on the customer display screen 317, or if present a signature capture/PIN pad screen 310, under the control of the processor 316.

It will be appreciated that although described with reference to checkout terminals comprising barcode scanners, the present invention is equally applicable to a checkout terminal where item details are entered manually.

It will be further appreciated that an embodiment of a checkout terminal is envisaged which comprises both a customer display screen and a receipt printer and in which the two-dimensional barcode is displayed on the customer screen and/or printed on the receipt, or displayed on a signature capture/PIN pad screen.

Figure 4:
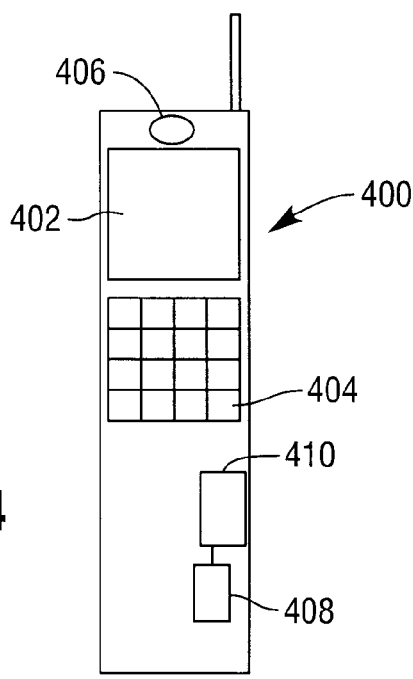
FIG. 4 is a schematic representation of a mobile telephone according to an aspect of the present invention.

Referring now to FIG. 4, a mobile telephone 400 comprises a display 402, a keypad 404, a camera 406, a processor 408 and a transceiver 410.

The processor 408, under the action of software, controls the camera 406 to capture an image of a two-dimensional barcode either displayed on the customer display 317, or signature capture/PIN pad screen of a checkout terminal 300 or on a receipt 120 printed by a receipt printer 118 of a checkout terminal 100. Typically, the software will be an applet running on the processor 408, and will have either been downloaded or will have come pre-installed on the mobile telephone 400.

The processor 408, under the action of the software, decodes the two-dimensional barcode from the captured image and takes appropriate actions dependent upon the information contained within the two-dimensional barcode, such barcode scanning and decoding applets are known, for example Redlaser. For example, the financial information contained within the two-dimensional barcode can be uploaded automatically to budgeting software such as Quicken or Mint, either on the mobile telephone 400 or uploaded to the customer's account over an Internet connection via the transceiver 410.

In the instance of a link to a webpage, for example to sign up for a manufacturer's warranty or for further information on the purchased product, a web-browser operating on the mobile telephone 400 would be opened via a graphical user interface (GUI) on the display 402 of the mobile telephone 400 with the customer navigating and entering appropriate information into the GUI via the keypad 404, or alternatively via a touchscreen.

Discount coupon's for future purchases and proof of purchase certificates can be extracted from the two-dimensional barcode by the processor 408 and recoded as conventional (one dimensional) or discrete two-dimensional barcodes which are then stored on the mobile telephone 400 such that they themselves can be scanned by a retailer to obtain the discount on a purchase or as a proof of purchase for an item return or refund purposes.

It will be appreciated that although described with reference to a checkout terminal any suitable transaction terminal can be used in the generation of the digital receipt. Non-limiting examples of such transaction terminals include: an automated teller machine (ATM), an information kiosk, an electronic funds transfer (EFT) terminal, a financial services centre, a bill payment kiosk, a lottery kiosk, a postal services machine, a check-in and/or check-out terminal, a self-checkout point-of-sale (POS) terminal, POS terminal.

Figure 5:
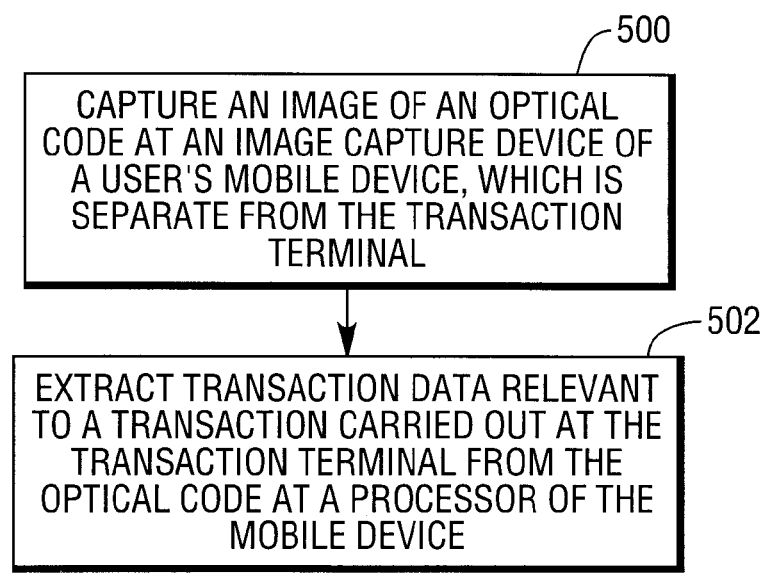
FIG. 5 is a flow chart detailing a method of receiving an electronic transaction receipt according to another aspect of the present invention.

Referring now to FIG. 5, a method of receiving electronic transaction receipt generated at a transaction terminal comprises capturing an image of said optical code at an image capture device of a user's mobile device, which is separate from the terminal (Step 500). A processor of the mobile device extracts transaction data relevant to a transaction carried out at the transaction terminal from the optical code (Step 502).

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

It will be further appreciated that non-mutually exclusive elements of differing embodiments of the present invention may be freely interchanged, where applicable.

Various modifications may be made to the above described embodiment without departing from the spirit and the scope of the invention.

The invention claimed is:

1. A mobile telephone device comprising:
a processor; and
an image capture device;
the image capture device being arranged to capture an information rich optical code corresponding to receipt data relevant to an item of a purchase transaction, the information rich optical code being output from an output device of a transaction terminal; and
the processor being arranged to extract data relevant to the purchase transaction carried out at the transaction terminal from the optical code, including proof of purchase data, to recode the proof of purchase data into a return transaction optical code, and to display the return transaction optical code during a return transaction involving the item.

2. The mobile telephone device according to claim 1 wherein, the information rich optical code comprises a two-dimensional barcode.

3. The mobile telephone device according to claim 1 wherein, additional data extracted by the processor is selected from the following: purchased items, store, sales person, cost per item, tax per item, total cost, total tax, digital authentication certificate, a link to a web page, discount coupon, warranty offer.

4. The mobile telephone device according to claim 3 wherein, the processor is arranged to activate a link to a web page upon the extraction of the link from the transaction data.

5. The mobile telephone device according to claim 1 wherein, the processor is arranged to act upon the data upon its being extracted from the information rich optical code.

6. The mobile telephone device according to claim 1 wherein, the processor is arranged to upload financial data extracted from the transaction data to a financial management application.

7. The mobile telephone device according to claim 1, wherein the mobile telephone device comprises any of the following: a smartphone, a tablet computer, a netbook.

8. The mobile device according to claim 1 wherein, the transaction terminal comprises any one of the following: an automated teller machine (ATM), an information kiosk, an electronic funds transfer (EFT) terminal, a financial services centre, a bill payment kiosk, a lottery kiosk, a postal services machine, a check-in and/or check-out terminal, a self-checkout point-of-sale (POS) terminal, POS terminal, a personal computer, another mobile device.

9. A method involving an electronic transaction receipt generated at a transaction terminal comprising:
capturing from an output device of a transaction terminal an information rich optical code corresponding to receipt data relevant to an item of a purchase transaction by a processor of a mobile device;
extracting data relevant to the purchase transaction carried out at the transaction terminal from the optical code, including proof of purchase data, by the processor of the mobile device;
recoding the proof of purchase data into a return transaction optical code by the processor of the mobile device; and
displaying the return transaction optical code at a return transaction terminal during a return transaction involving the item by the processor of the mobile device.

* * * * *